United States Patent
Wu

(10) Patent No.: US 6,837,822 B2
(45) Date of Patent: Jan. 4, 2005

(54) STRUCTURE OF GEAR CLUSTER FOR A BICYCLE

(75) Inventor: Chin Fu Wu, Walnut Creek, CA (US)

(73) Assignee: Norman Lean, Taipei (TW)

( * ) Notice: Subject to any disclaimer, the term of this patent is extended or adjusted under 35 U.S.C. 154(b) by 0 days.

(21) Appl. No.: 10/383,759

(22) Filed: Mar. 10, 2003

(65) Prior Publication Data

US 2003/0186776 A1 Oct. 2, 2003

(30) Foreign Application Priority Data

Mar. 26, 2002 (TW) ...................................... 91203980 U

(51) Int. Cl.[7] .................................................. F16H 3/44
(52) U.S. Cl. ........................ 475/269; 475/311; 475/318; 475/320; 475/323; 475/297; 475/299; 192/48.92; 74/478; 74/594.1; 74/594.2; 74/594.3
(58) Field of Search ............................... 475/269, 311, 475/317, 318, 320, 323, 296, 297, 298, 299; 192/48.92; 74/478, 594.1–3

(56) References Cited

U.S. PATENT DOCUMENTS

| | | | | |
|---|---|---|---|---|
| 4,644,828 A | * | 2/1987 | Kozakae | ...................... 475/16 |
| 5,378,201 A | * | 1/1995 | Lee et al. | ...................... 474/77 |
| 6,007,447 A | * | 12/1999 | Lin | .............................. 475/149 |
| 6,142,904 A | * | 11/2000 | Yoo | .............................. 475/12 |
| 6,296,072 B1 | * | 10/2001 | Turner | ........................ 180/220 |

FOREIGN PATENT DOCUMENTS

JP           05058378 A  *  3/1993   .......... B62M/11/18

* cited by examiner

*Primary Examiner*—Roger Pang
*Assistant Examiner*—David D. Le
(74) *Attorney, Agent, or Firm*—Leong C. Lei

(57) ABSTRACT

An improved structure of a gear cluster for a bicycle having a crankset mounted with a crankshaft provided with a planetary gear module, wherein the planetary gear module includes a big wheel and a small wheel section and the planetary gear module drives an inner gear module mounted onto a gear plate, One lateral side of the crankshaft is provided with a driving structure including a second driving wheel and a third driving wheel engageable with the big and small wheels and the crankshaft is provided with a regulating structure for the positioning of the driving structure. The regulating structure includes two sets of a second and a third ratchet blocks for the positioning or free rotating of the second and the third driving wheels. The regulating structure is provided with a triggering structure to act on different ratchet block.

9 Claims, 7 Drawing Sheets

STRUCTURE OF GEAR CLUSTER FOR A BICYCLE

BACKGROUND OF THE INVENTION (a) Technical Field of the Invention

The present invention relates to gear cluster for a bicycle, and in particular, an improved structure of gear cluster which enables rapid gear-shifting and a small force for gear-shifting action.

(b) Description of the Prior Art

Conventional gear cluster for bicycle is mounted at the lower end of the vertical support of the bicycle and is closely located at the position of the crankshaft. In order to avoid interruption with the movement of the crankshaft while pedaling the bicycle, the gear cluster is designed with great limitation. Further the cable for triggering the gear cluster is fixed to the seat frame. When gear shifting, the chain has to be partially at the other corresponding gear plate so as to proceed with gear shift. As a result, the gear cluster design cannot be easily improved.

Taiwanese patent application no. 90205591 relates to an improved structure of a gear cluster. The crank shaft seat is provided with a securing ring mount having gear bust therein which can be moved forward or backward. The external side of the housing is provided with gear plate so that the user can directly control the gear bush so as to change the inner and external teeth mount and the combination with the planetary gear. However, in this conventional gear cluster, it is laborious to adjust.

In view of the above, it is an object of the present invention to provide an improved structure of gear cluster for bicycle which can solve the above-mentioned drawbacks.

SUMMARY OF THE INVENTION

Accordingly, it is an object of the present invention to provide an improved structure of a gear cluster for a bicycle having a crankset mounted with a crankshaft provided with a planetary gear module, wherein the planetary gear module comprises a big wheel and a small wheel section and the planetary gear module drives an inner gear module mounted onto a gear plate; one lateral side of the crankshaft is provided with a driving structure including a second driving wheel and a third driving wheel engageable with the big and small wheel, and the crankshaft is provided with a regulating structure for the positioning of the driving structure and the regulating structure includes two set of a second and a third ratchet block for the positioning or free rotating of the second and the third driving wheel, and the regulating structure is provided with a triggering structure to act on different ratchet block, and the triggering structure makes use of a cable to provide triggering, thereby a gear shift is obtained so as to provide rapid gear shifting and to reduce the force used for gear shifting.

An aspect of the present invention is to provide an improved structure of a gear cluster for a bicycle, wherein the inner face of the crankshaft is provided with an engaging slot and the slot holds a driving ring having a corresponding shape thereof, and the inner edge of the driving ring is formed into a series of inner ratchet gears and the gear on the planetary gear module employs shaft rod to pass through the driving ring, and the external side of the third driving wheel is extended to form a protruded shaft section having a ring slot, and the inner shape of the protruded shaft section is formed into a series of ratchet slots, and the ratchet slots makes use of a binding ring to bind the ratchet block and the ratchet block corresponds to the driving ring of the crankshaft.

Other object and advantages of the present invention will become more apparent from the following description taken in conjunction with the accompanying drawing.

DETAILED DESCRIPTION OF THE PREFERRED EMBODIMENT

Figure 1:
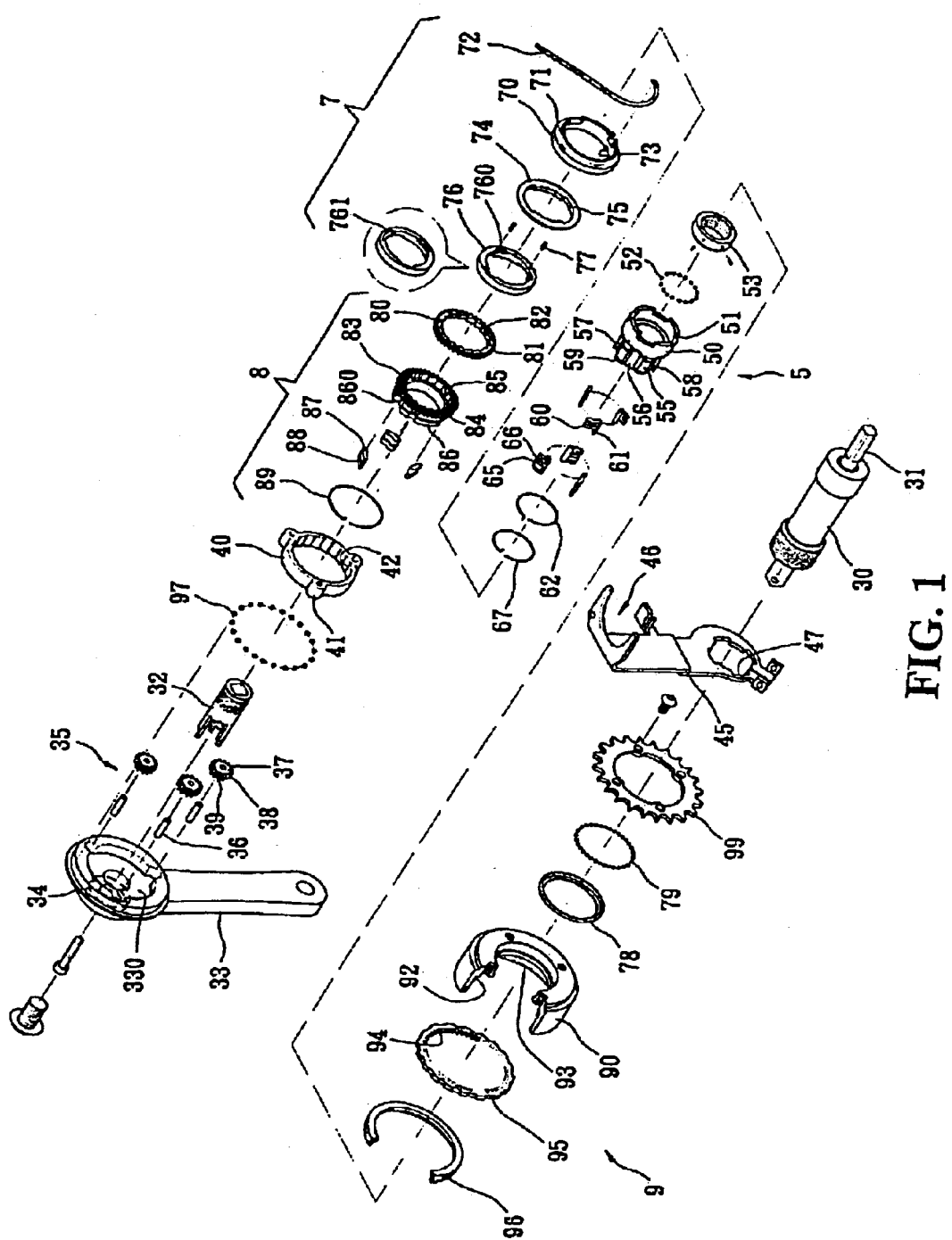
FIG. 1 is a perspective exploded view of the present invention.

In accordance with the present invention, the gear cluster structure has a crankset 33 of the crankshaft seat 30 mounted with a driving structure 8. The driving structure 8 is actuated by a regulating structure 5 for speed shifting. The regulating structure 5 is mounted with a triggering structure 7 and at the same time, the crankset 33 is mounted with a planetary gear module 35. The planetary gear module 35 can drive the inner gear mount 9 having a gear plate 99 so as to form a gear cluster.

Figure 2:
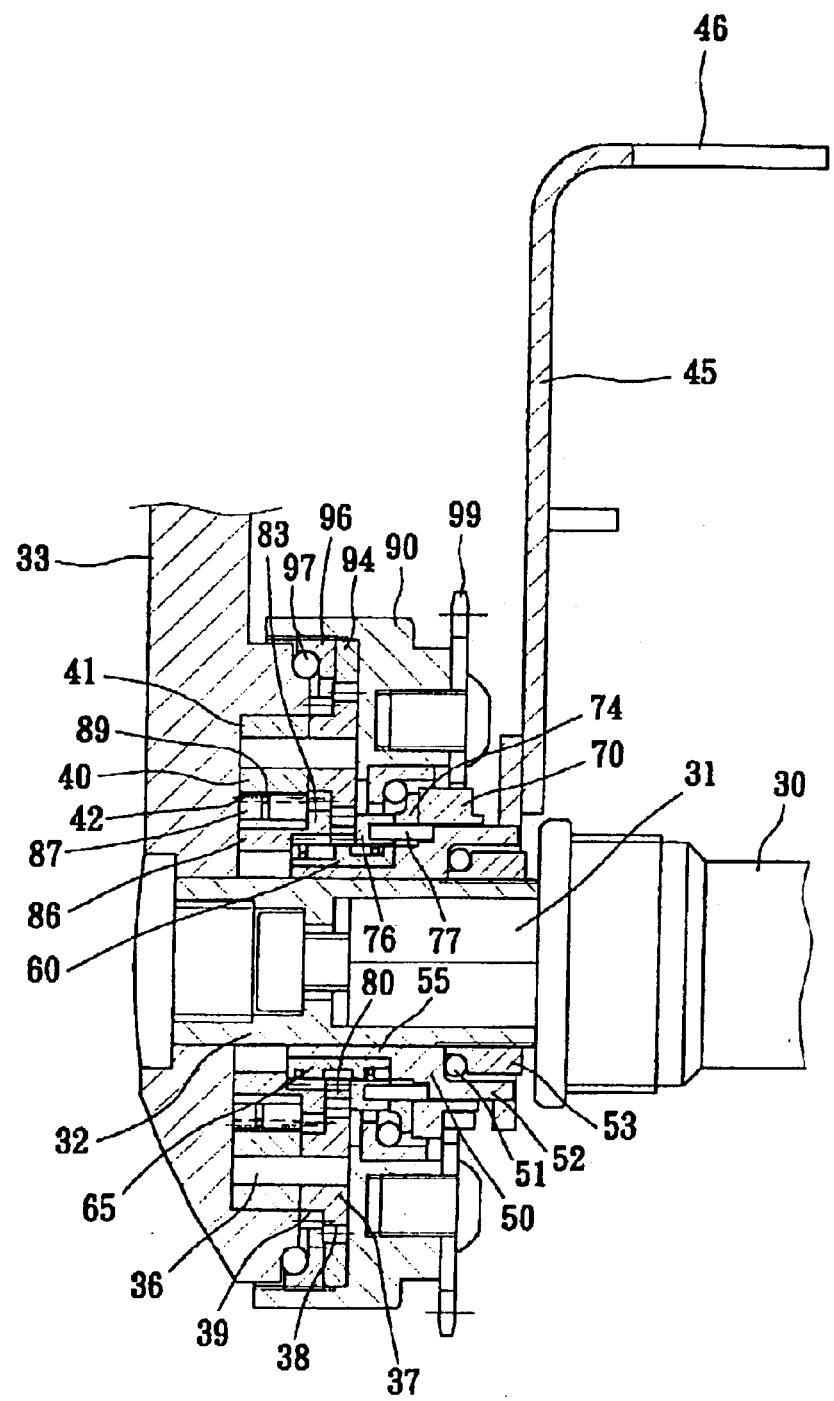
FIG. 2 is a sectional view of the present invention.

As shown in FIGS. 1 and 2, the crankshaft seat 30 is pivotally mounted with a crank set 33. One end of the crankshaft 31 is provided with a braking bush 32 and the braking bush 32 is mounted with a crankshaft having a braking slot 34. A user can pedal the crankset 33 so as to ride the bicycle. The circumferential edge of the crankset 33 is provided with an engaging slot 330 and the slot 330 holds a driving ring 40 having a corresponding shape thereof, and the inner edge of the driving ring 40 is formed into a series of inner ratchet gears 42 and the gear on the planetary gear module 35 employs shaft rod 36 to pass through the driving ring 40. The shaft rod 36 is mounted with gear 37 of a big wheel section 38 and a small wheel section 39. The big and small wheel sections of the gear 37 are respectively in engagement with the driving structure 8 and the planetary gear module 35 is in engaged with the inner gear mount 9 of the gear plate 99.

The regulating structure 5 has an actuating shaft seat 50 passed through the braking bush 32, and the inner side of the actuating shaft seat 50 employs a bead module 52 to connect with a nut 53, and the nut 53 is locked to the braking bush 32, and the actuating shaft seat 50 employs a braking plate 45 corresponding to the bicycle frame for positioning, and the actuating shaft seat 50 is extended to form a protruded shaft section 55 having two groups of apart ratchet slots 56, 57, and the inner and external side of the protruded shaft section 55 are respectively provided with ring slots 58, 59, and the two ratchet slots 56, 57 are adapted for a second ratchet block 60 and a third ratchet block 65, wherein the second ratchet block 60 employs a binding ring 62 to bind at the inner side of the protruded shaft section 55 and the third ratchet block 65 makes use of another binding ring 67 to bind at the external side of the protruded shaft section 55 such that the second and the third ratchet blocks 60, 65 are engageable with the second and third driving wheels of the driving structure 8.

In accordance with the present invention, the driving structure 8 actuated by the regulation structure 5 is constituted from a second driving wheel 80 and a third driving wheel 83. The second driving wheel 80 is provided with external teeth 81 for engagement with the big wheel section 38 of the planetary gear module 35. The inner edge of the second driving wheel 80 is formed into the inner ratchet teeth 82 for engagement with the second ratchet block 60. The external edge of the third driving wheel 83 is formed into external teeth 84 for engagement with the small wheel section 39 of the gear 37 and the inner edge is formed into inner ratchet teeth 85 corresponding to the third ratchet block 65. The external side of the third driving wheel 83 is extended to form a protruded shaft section 86 having a ring slot, and the inner shape of the protruded shaft section 86 is formed into a series of ratchet slots 860, and the ratchet slots 860 make use of a binding ring 89 to bind the ratchet block 87 and the ratchet block 87 corresponds to the driving ring 40 of the crankshaft 33.

In accordance with the present invention, the triggering structure 7 has a rotating block 70, and the inner side face of the rotating block 70 is extended with a flange 71 for the securing of a restoration spring 72, and the circumferential edge of the rotating block 70 has two corresponding braking blocks 73, and the external side of the rotating block 70 is provided with a limiting ring plate 74 mounted at the regulating structure 5, and the inner edge of the limiting ring plate 74 is formed into extension hole 75 having two corresponding braking blocks, and the external side of the limiting ring plate 74 is provided with a deactivating having a driving rod, and the inner and external edge of the shaft hole is formed into a second engaging slot 760 and the third engaging slot 761 for the spring up or the depression of the second and the third ratchet block 60, 65, and the driving rod of the deactivating ring is extended into the extension slot of the limiting ring plate 74 so as to trigger the second and the third ratchet blocks 60, 65.

The inner teeth module 9 is provided with a housing seat 90 and the inner edge of the housing seat 90 is formed into an inner teeth section 92 and the inner teeth section 92 is for the mounting of an outer edge corresponding to the external teeth 95 and the inner teeth 94 is in engagement with the small wheel section of the planetary gear module and the teeth plate 99 is locked to the lateral face of the housing seat 90.

The inner edge of the housing seat 90 is formed into inner threads for the locking with the inner nut 96 having inner threads, and the inner nut 96 makes use a bead module 97 to pivotally mount with the inner side of the crankshaft 33 such that the crankshaft 33 rotates with respect to the housing seat 90.

Figure 7:
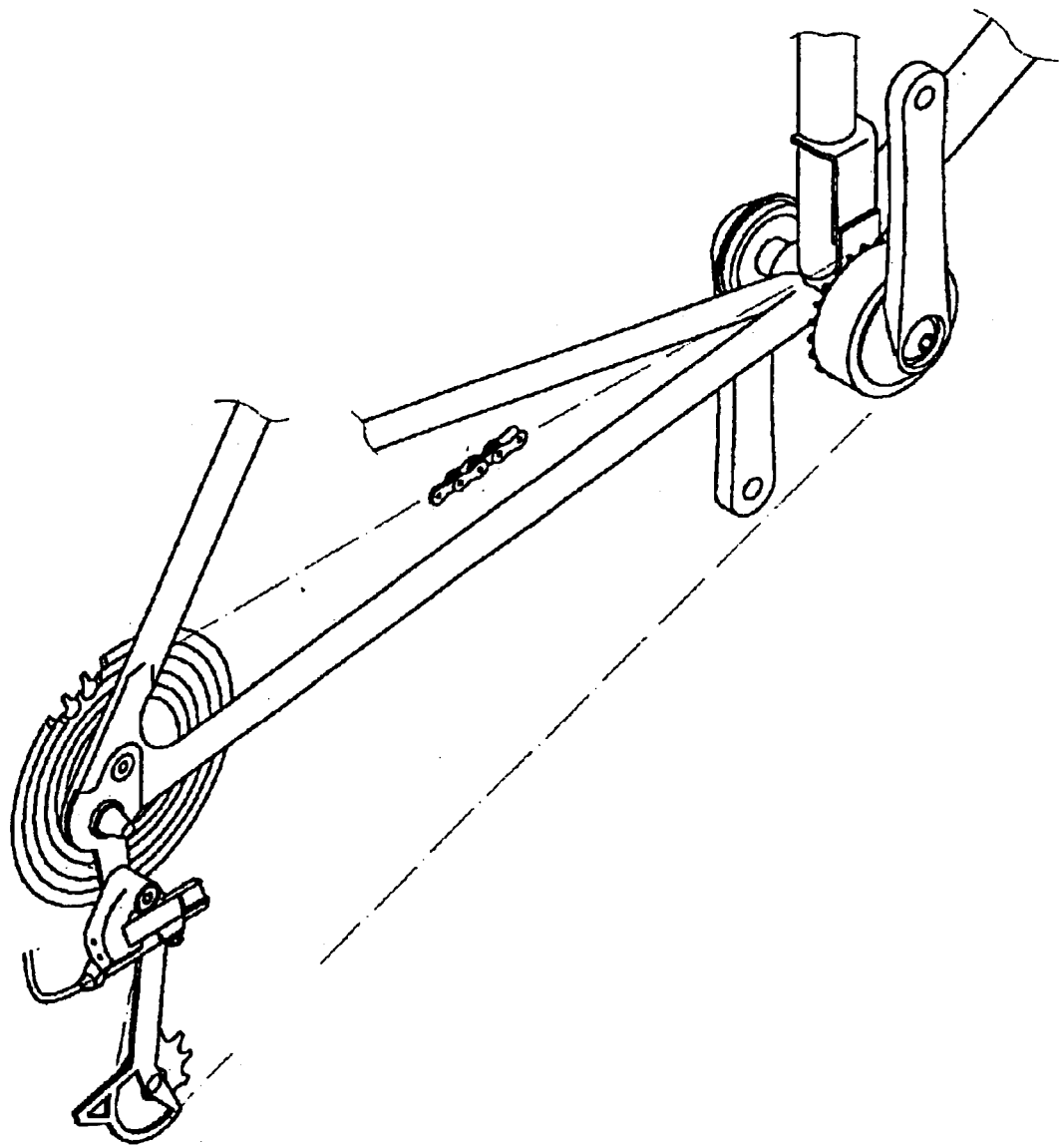
FIG. 7 is a perspective view of the present invention showing the application of the invention within the bicycle.

FIG. 7 shows the application of the present invention on a bicycle.

Figure 3:
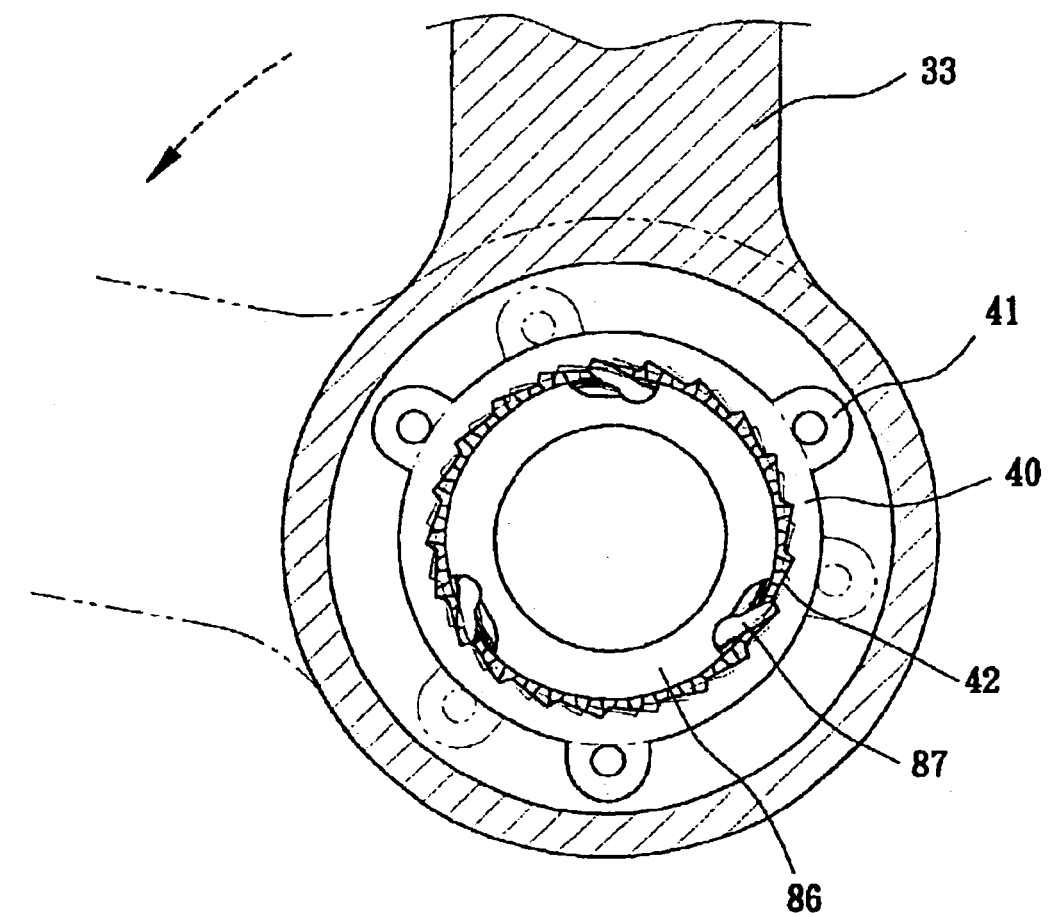
FIG. 3 is a plan view of the present invention at a driving state.
Figure 4A:
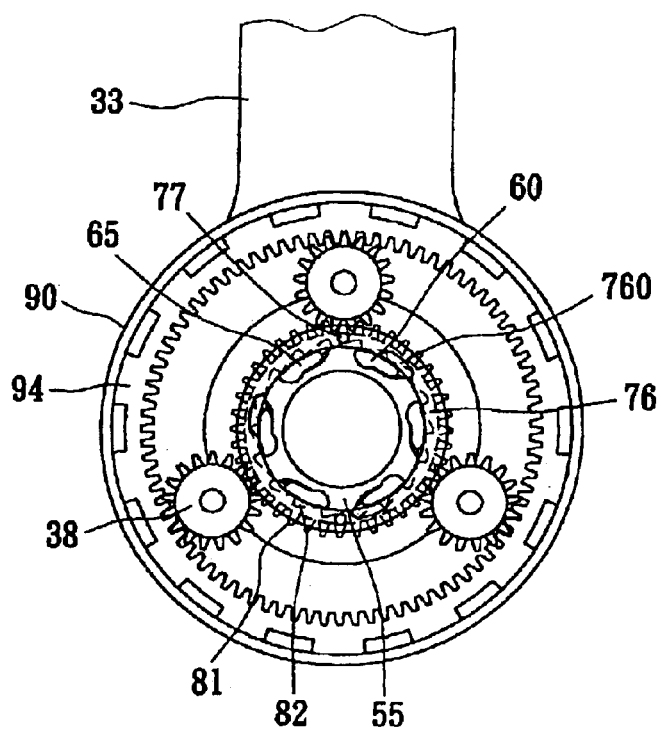
FIG. 4 is a schematic view showing first section speed change, wherein A is the back of B.
Figure 4B:
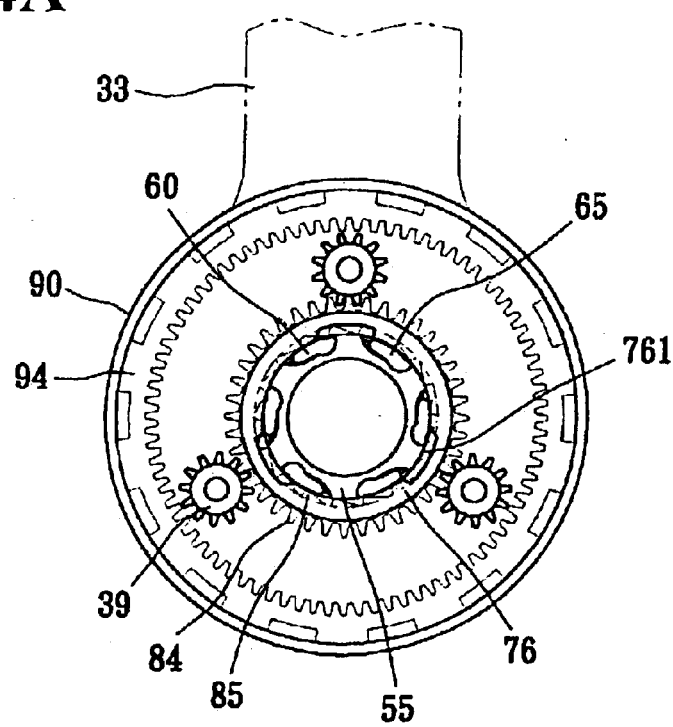

Referring to FIGS. 3 and 4 and 1 and 3 for application of the present invention. If the cable is not pulled, the rotating block 70 on the triggering structure 7 will not rotate. The actuating ring 76 is also not rotated and the second and the third ratchet blocks 60, 65 of the actuating shaft set 50 are pressed such that the second the third ratchet blocks 60, 65 cannot be engaged with the second and the third driving wheels 80,83. At this instance, the driving structure 8 and the regulating structure 5 move independently. When the user steps onto the crankshaft 33, the gear 37 will actuate the inner gear mount 94 so that the teeth plate 99 of the housing 90 is locked to form first section speed output.

Figure 5A:
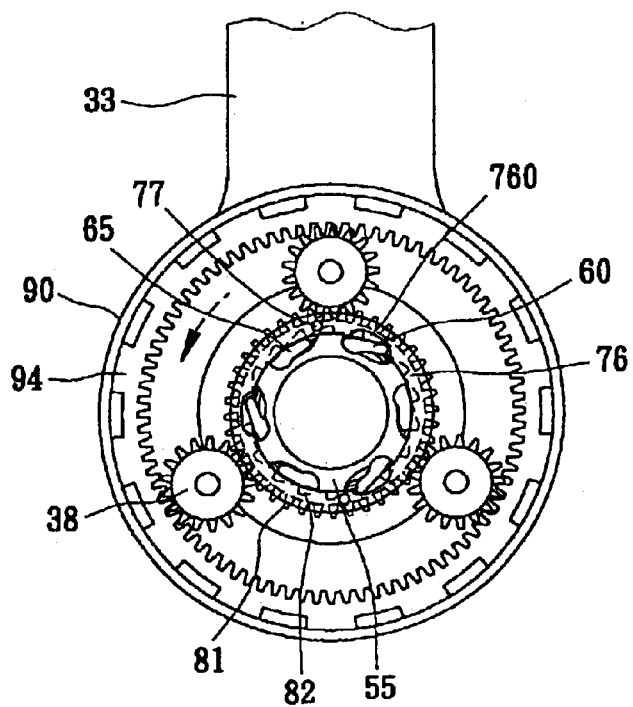
FIG. 5 is a schematic view showing second section speed change, wherein A is the back of B.
Figure 5B:
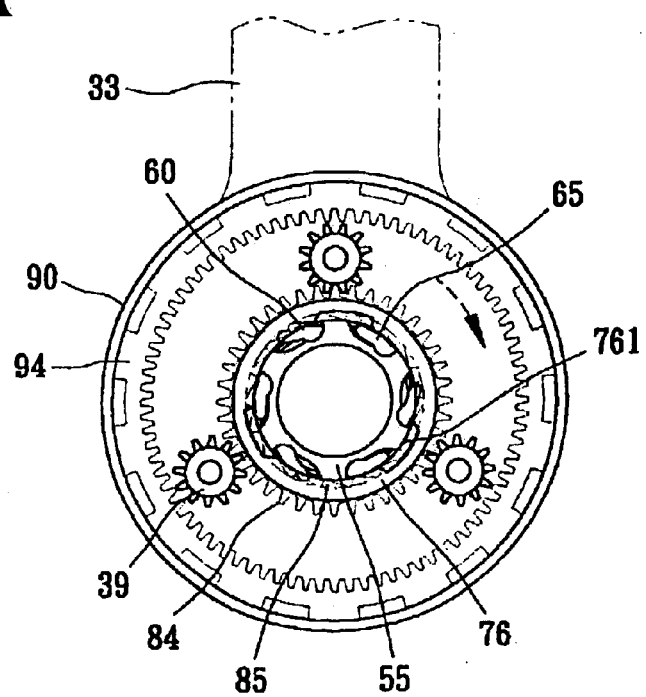

When the user pulls the rotating block 70 of the triggering structure 7, as shown in FIG. 5, the rotating block 70 acts on the actuating ring 76 via the braking block 73. When the second engaging slot 760 is corresponding to the second ratchet block 60, the second ratchet block 60 will spring up by the action of the binding ring 62 and the second ratchet block 60 will corresponding to the inner ratchet gear 82 of the second driving wheel 80. When the second driving wheel 80 is stationery as a result of the second ratchet block 60, and the big wheel section 38 engages with the second driving wheel 80, the rotating speed of the teeth plate 99 of the crankshaft 33 is changed and this is the second section of speed change.

Figure 6A:
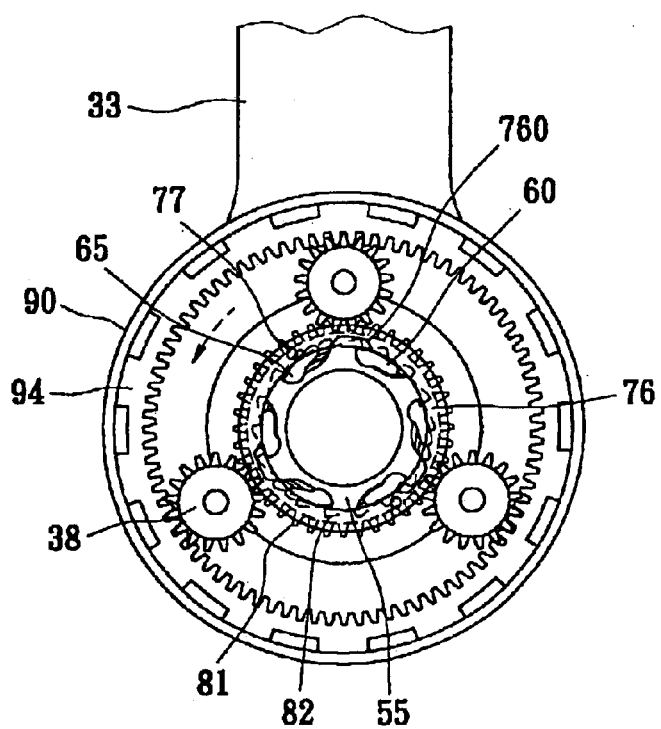
FIG. 6 is a schematic view showing third section speed change, wherein A is the back of B.
Figure 6B:
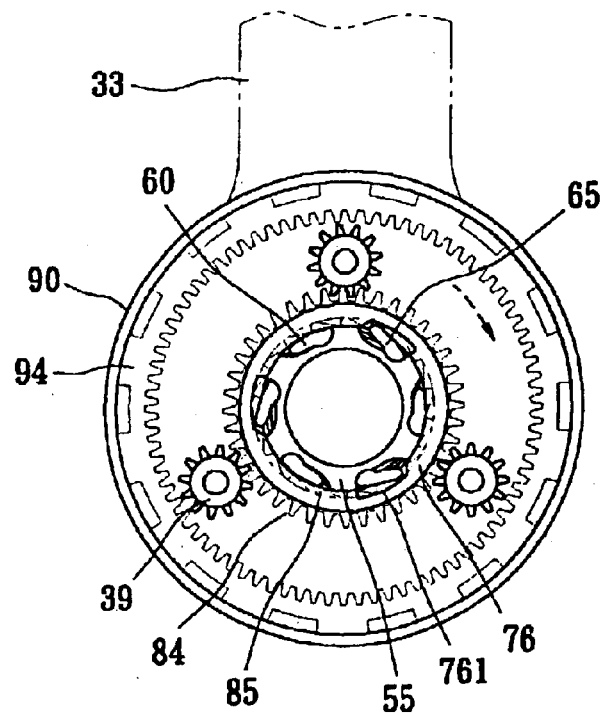

Referring to FIG. 6, when the user further pulls the cable for next speed change, the rotating block 70 is pulled and the braking block 73 moves the actuating ring 76. When the actuating ring 76 moves, the second engaging slot 760 is disengaging from the second ratchet block 60 and the second ratchet block 60 is pressed and at the same time, the third engaging slot 761 is gradually corresponding to the third ratchet block 65 and the third ratchet block is sprung out as a result of the binding ring 67 and the third ratchet block 65 is corresponding to the inner ratchet wheel 85 of the third driving wheel 83. Due to the engagement of the small wheel section 39 with the third driving wheel 83, speed change is obtained via the planetary gear module so as to achieve the third section of speed change.

The improved structure of the present invention achieves the following advantages:
(1) Rapid in gear-shifting. As the ratchet block is directly sprung out to proceed with engagement action, this will improve the speed of gear-shifting.
(2) Applied force for gear-shifting being small. In the present invention, only the cable is pulled so as to regulate the angle of the actuating ring to correspond to the actuating shaft seat and the light weight ratchet blocks are respectively sprung out, and therefore the force that applied is small.
(3) Confirmation of gear-shifting. The gear-shifting is instant and no waiting for the gears to engage with each other is needed. In other words, gear-shifting can be performed anytime.
(4) Apply force by stepping. As the driving ring is provided on a crankshaft and in combination with the ratchet block of the driving structure, when the crankshaft is stepped, the crankshaft is rotated in a reverse direction freely so as to improved the convenient and force for forward pedaling.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:
1. An improved structure of a gear cluster for a bicycle having a crankset mounted with a crankshaft provided with a planetary gear module, wherein the planetary gear module comprises a big wheel and a small wheel section and the planetary gear module drives an inner gear module mounted onto a gear plate; one lateral side of the crankshaft is provided with a driving structure including a second driving wheel and a third driving wheel engageable with the big and small wheel, and the crankshaft is provided with a regulating structure for the positioning of the driving structure and the regulating structure includes two sets of a second and a third ratchet block for the positioning or free rotating of the second and the third driving wheel, and the regulating structure is provided wit a triggering structure to act on different ratchet block, and the triggering structure makes use of a cable to provide triggering; thereby a gear shift is obtained so as to provide rapid gear shifting and to reduce the force used for gear shifting, wherein one end of the crankshaft is secured with a braking bush for securing the crankshaft having an engaging hole.

2. The structure as set forth in claim 1, wherein the inner face of the crankshaft is provided with an engaging slot and the slot holds a driving ring having a corresponding shape thereof, and the inner edge of the driving ring is formed into a series of inner ratchet gears and the gear on the planetary gear module employs shaft rod to pass through the driving ring, and the external side of the third driving wheel is extended to form a protruded shaft section having a ring slot, and the inner shape of the protruded shaft section is formed into a series of ratchet slots, and the ratchet slots makes use of a binding ring to bind the ratchet block and the ratchet block corresponds to the driving ring of the crankshaft.

3. The structure as set forth in claim 1, wherein the regulating structure has an actuating shaft seat passed through the crankshaft, and the inner side of the actuating shaft seat employs a bead module to connect with a nut, and the nut is locked to the braking bush, and the actuating shaft seat employs an braking plate corresponding to the bicycle frame for positioning, and the actuating shaft seat is extended to form a protruded shaft section having two groups of apart ratchet slots, and the inner and external side of the protruded shaft section are respectively provided with a ring slot, and the two ratchet blocks are adapted for a second ratchet block and a third ratchet block, wherein the second ratchet block employs a binding ring to bind at the inner side of the protruded shaft section and the third ratchet block makes use of another binding ring to bind at the external side of the protruded shaft section such that the second and the third ratchet block are engageable with the second and third driving wheel of the driving structure.

4. The structure of claim 3, wherein the actuating shaft adjacent to one lateral side of the nut is extended to form an engaging teeth section and the braking plate is provided with a braking hole corresponding to the engaging teeth section, and the braking plate is provided with an engaging slot section mounted onto the bicycle frame such that the actuating shaft seat is stationery.

5. The structure of claim 1, wherein the triggering structure has a rotating block, and the inner side face of the rotating block is extended with a flange for the securing of a restoration spring, and the circumferential edge of the rotating block has two corresponding braking blocks, and the external side of the rotating block is provided with a limiting ring plate mounted at the regulating structure, and the inner edge of the limiting ring plate is formed into extension hole having two corresponding braking blocks, and the external side of the limiting ring plate is provided with a deactivating ring having a driving rod, and the inner and external edge of a shaft hole is formed into a second engaging slot and a third engaging slot for the spring up or the depression of the second and the third ratchet block, and the driving rod of the deactivating ring is extended into an extension slot of the limiting ring plate so as to trigger the second and the third ratchet blocks.

6. The structure of claim 5, wherein the outer edge of the limiting ring plate uses a bead module and an inner gear bush for pivotal mounting.

7. The structure of claim 1, wherein the second driving wheel has an outer teeth for the engagement with the big wheel section of the planetary gear module, and the inner edge of the second driving wheel is formed into an inner ratchet wheel for the engagement with the second ratchet block, and the external edge of the third driving wheel is formed into outer gear for the engagement with the small wheel section of the gear module.

8. The structure of claim 1, wherein the inner teeth module is provided with a housing seat and the inner edge of the housing seat is formed into an inner teeth section and the inner gear section is for the mounting of an outer edge corresponding to the external teeth and the inner teeth is in engagement with the small wheel section of the planetary gear module and the teeth plate is locked to the lateral face of the housing.

9. The structure of claim 8, wherein the inner edge of the housing seat is formed into inner threads for the locking with the inner nut having inner threads, and the inner nut makes use a bead module to pivotally mount with the inner side of the crankshaft such that the crankshaft rotates with respect to the housing seat.

* * * * *